United States Patent
Amin et al.

(10) Patent No.: US 11,153,907 B2
(45) Date of Patent: Oct. 19, 2021

(54) METHOD AND ACCESS NODE FOR CONTROLLING UPLINK TRANSMISSIONS IN A WIRELESS NETWORK

(71) Applicant: Telefonaktiebolaget LM Ericsson (publ), Stockholm (SE)

(72) Inventors: Parth Amin, St Albans (GB); Luis Felipe Del Carpio Vega, Espoo (FI); Yu Wang, Solna (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 156 days.

(21) Appl. No.: 16/347,851

(22) PCT Filed: Nov. 18, 2016

(86) PCT No.: PCT/SE2016/051147
§ 371 (c)(1),
(2) Date: May 7, 2019

(87) PCT Pub. No.: WO2018/093305
PCT Pub. Date: May 24, 2018

(65) Prior Publication Data
US 2019/0357254 A1    Nov. 21, 2019

(51) Int. Cl.
*H04W 74/08* (2009.01)
*H04W 16/14* (2009.01)
*H04W 72/12* (2009.01)

(52) U.S. Cl.
CPC ....... *H04W 74/0816* (2013.01); *H04W 16/14* (2013.01); *H04W 72/1268* (2013.01)

(58) Field of Classification Search
CPC ... H04W 74/0808–0825; H04W 16/14; H04W 72/1268
See application file for complete search history.

(56) References Cited

U.S. PATENT DOCUMENTS

| 2013/0077497 A1 | 3/2013 | Bae et al. |
| 2014/0071959 A1 | 3/2014 | Ghosh et al. |

(Continued)

FOREIGN PATENT DOCUMENTS

| EP | 2 553 826 B1 | 9/2014 |
| WO | WO 2016/176110 A1 | 11/2016 |

OTHER PUBLICATIONS

International Search Report and Written Opinion of the International Searching Authority, PCT/SE2016/051147, dated Aug. 18, 2017, 15 pages.

(Continued)

*Primary Examiner* — Eric Myers
(74) *Attorney, Agent, or Firm* — Sage Patent Group (57) ABSTRACT

A method and an access node of a wireless network, for controlling uplink transmissions from wireless devices. It is detected that both a Narrow Band wireless device capable of receiving signals on a first narrow bandwidth channel and one or more legacy wireless devices capable of receiving signals on a second broad bandwidth channel are present. The second broad channel covers the first narrow channel. When receiving an uplink transmission from the Narrow Band device that indicates pending uplink data, the access node performs a downlink transmission that both Narrow Band wireless devices and legacy wireless devices can receive and decode. The downlink transmission indicates that the Narrow Band wireless device is allowed to transmit its pending uplink data on allocated resources within the first bandwidth channel, and that the second bandwidth channel is occupied.

15 Claims, 4 Drawing Sheets

(56) References Cited

U.S. PATENT DOCUMENTS

2015/0117365 A1    4/2015  Merlin et al.
2018/0132278 A1*   5/2018  Oteri ................. H04W 74/0808
2018/0302858 A1*  10/2018  Son ....................... H04L 5/0041

OTHER PUBLICATIONS

Carrier-sense multiple access with collision avoidance: Wikipedia, Last edited Aug. 16, 2016 [printed on May 3, 2019], 4 Pages.
Minyoung Park et al., Intel Corporation, Coexistence Problem, Jan. 18, 2016, IEEE 802.11-16/0026r0, 11 Pages.
European Search Report for European Application for EP 16921566.2, dated Sep. 25, 2019, 4 Pages.
Etri, "Discussion on LTE-LAA hidden node terminal problem", 3GPP TSG-RAN1#78B, Ljubljana, Slovenia, Oct. 6-Oct. 10, 2014, R1-143962, 6 Pages.

* cited by examiner

Fig. 7 though this description, Further, the term "access point",
is used herein to represent any node of a radio network that
is operative to communicate radio signals with wireless
devices. The access point discussed herein could also be
referred to as a network node, base station, radio node,
e-NodeB, eNB, NB, base transceiver station, etc., depending
on the type of network and terminology used.

For example, multiple wireless devices may be served by
an access point for transmitting uplink data to the wireless

METHOD AND ACCESS NODE FOR CONTROLLING UPLINK TRANSMISSIONS IN A WIRELESS NETWORK

CROSS REFERENCE TO RELATED APPLICATIONS

This application is a 35 U.S.C. § 371 national stage application of PCT International Application No. PCT/SE2016/051147 filed on Nov. 18, 2016, the disclosure and content of which is incorporated by reference herein in its entirety.

TECHNICAL FIELD

The present disclosure relates generally to a method and an access node of a wireless network, for controlling uplink transmissions from wireless devices.

BACKGROUND

In the field of mobile or wireless communication, different types of radio networks have been developed to provide radio access for various wireless devices. The radio networks are constantly developed to meet demands from subscribers using increasingly advanced services and devices such as smartphones and tablets, which may require considerable amounts of bandwidth and resources for data transport in the networks. It is therefore of interest to improve and optimize the capacity and performance in such radio networks, e.g. by utilizing available radio resources efficiently for radio communication.

In a wireless network such as a WiFi network, it is generally desirable to avoid or at least reduce interference caused by uplink transmissions from two or more wireless devices on the same radio resource or bandwidth channel at the same time. When such collisions occur, none of the transmissions can typically be received and decoded properly by a serving access point, due to the interference and the transmissions have therefore been made in vain. In this case the wireless devices need to retransmit their data, sometimes more than once, until it is properly received at the access point, only adding delay in the communications and consuming precious radio resources in the network and battery in the wireless devices. Reduced interference by avoiding such collisions could thus enhance both capacity and performance in the network.

In this disclosure, the term "wireless device" is used to represent any communication entity capable of radio communication with a wireless network by sending and receiving radio signals, such as e.g. mobile telephones, smartphones, User Equipment (UEs), tablets, laptop computers and Machine-to-Machine, M2M, devices, the latter also known as Machine Type Communication, MTC, devices.

Another common generic term used in some wireless networks such as WiFi networks is "Station, STA" which is also sometimes used herein instead of wireless device, and the terms STA and wireless device are thus interchangeable throughout this disclosure. Further, the term "access point", is used herein to represent any node of a radio network that is operative to communicate radio signals with wireless devices. The access point discussed herein could also be referred to as a network node, base station, radio node, e-NodeB, eNB, NB, base transceiver station, etc., depending on the type of network and terminology used.

For example, multiple wireless devices may be served by an access point for transmitting uplink data to the wireless network which data may have been accumulated in a buffer at the respective wireless device, referred to as "pending uplink data" in this description. Further, the access point may serve wireless devices of different types including "Narrow Band" wireless devices which are capable of decoding signals received on a first narrow bandwidth channel and "legacy" wireless devices capable of decoding signals received on a second bandwidth channel which is broader than the first bandwidth channel. The second bandwidth channel also covers the first bandwidth channel, meaning that the frequency band available for the first bandwidth channel is within the frequency band available for the second bandwidth channel. In this description, a Narrow Band wireless device will be referred to as an NB device for short and a legacy wireless device will be referred to simply as a legacy device.

In the field of WiFi networks, the IEEE standard 802.11 and variants thereof are typically used in the communications. Data and signaling messages are further communicated in so-called "frames" of a predefined format and size. In wireless communication under 802.11 standard, most frames transmitted carry a duration field which is used for reserving the use of a channel to a transmitting STA for a specific time. Because each channel has other STAs which are not active for a frame, the duration field signals to other STAs the reserved status of a channel within a duration for the transmitting and receiving STAs. Thereby, the other STAs are told not to transmit anything within the reserved time specified in the duration field.

Further, a Network Allocation Vector (NAV) Timer in a STA accounts and counts down the time of which the channel will be reserved from the duration field. STAs will normally have a buffer to store the NAV timer and to count down time from the reserved duration. So when a STA reads the duration field in an allocation message it will set and start its NAV timer which will expire when the allocation is finished.

However, it is a problem that when both Narrow Band devices and legacy devices are present it may happen that an access point allows a Narrow Band device to transmit pending uplink data in the first bandwidth channel during a certain time interval, and that the legacy devices are unaware that the first bandwidth channel within the second bandwidth channel will be used by the Narrow Band device. It may therefore happen that a legacy device performs a transmission on the second bandwidth channel at the same time as the Narrow Band device transmits its uplink data on the first bandwidth channel. The two transmissions may therefore more or less collide since the second bandwidth channel covers the first bandwidth channel, as mentioned above.

Figure 1:
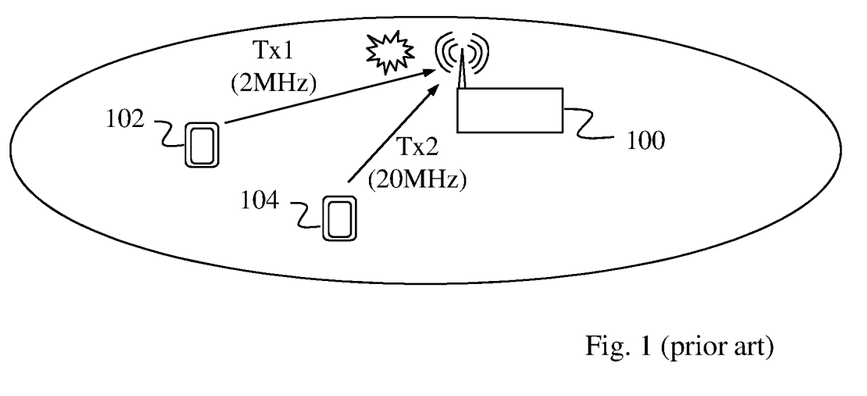
FIG. 1 is a communication scenario illustrating how interference may occur, according to the prior art.

FIG. 1 illustrates a communication scenario where such a collision occurs at a receiving access node 100 as a result from a first transmission Tx1 from an NB device 102 on a first bandwidth channel B1 of 2 MHz and a simultaneous, or at least overlapping, second transmission Tx2 from a legacy device 104 on a second bandwidth channel B2 of 20 MHz. Thereby, the access node 100 is not able to properly receive and decode either of Tx1 and Tx2, and retransmissions would be required from the devices 102, 104 in order to get the respective data across to the access node 100, with the risk of another collision for the same reason.

SUMMARY

It is an object of embodiments described herein to address at least some of the problems and issues outlined above. It is possible to achieve this object and others by using a method and an access node as defined in the attached independent claims.

According to one aspect, a method is performed by an access node of a wireless network, for controlling uplink transmissions from wireless devices. In this method, the access node detects presence of at least one Narrow Band wireless device capable of receiving and decoding signals on a first bandwidth channel. The access node also detects presence of at least one legacy wireless device capable of receiving and decoding signals on a second bandwidth channel which is broader than and covers the first bandwidth channel.

When receiving from a Narrow Band wireless device an uplink transmission that indicates pending uplink data in the Narrow Band wireless device, the access node performs a downlink transmission that both Narrow Band wireless devices and legacy wireless devices can receive and decode. The downlink transmission indicates that the Narrow Band wireless device is allowed to transmit its pending uplink data on allocated resources within the first bandwidth channel, in response to the received request, and that the second bandwidth channel is occupied.

Thereby, it is an advantage that the Narrow Band wireless device's uplink transmission can be protected from interference by informing any legacy device(s) that the second bandwidth channel is occupied so that they will not transmit anything that could interfere with the uplink transmission on the first bandwidth channel.

According to another aspect, an access node is arranged to control uplink transmissions from wireless devices in a wireless network. The access node is configured to detect presence of at least one Narrow Band wireless device capable of receiving and decoding signals on a first bandwidth channel, and presence of at least one legacy wireless device capable of receiving and decoding signals on a second bandwidth channel which is broader than and covers the first bandwidth channel.

The access node is also configured to receive from a Narrow Band wireless device an uplink transmission that indicates pending uplink data in the Narrow Band wireless device. The access node is further configured to perform a downlink transmission that both Narrow Band wireless devices and legacy wireless devices can receive and decode, wherein the downlink transmission indicates that the Narrow Band wireless device is allowed to transmit its pending uplink data on allocated resources within the first bandwidth channel, in response to the received request, and that the second bandwidth channel is occupied.

The above method and access node may be configured and implemented according to different optional embodiments to accomplish further features and benefits, to be described below.

A computer program is also provided comprising instructions which, when executed on at least one processor in the access node, cause the at least one processor to carry the method described above for the access node. A carrier is also provided which contains the above computer program, wherein the carrier is one of an electronic signal, optical signal, radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to reduce the risk of collisions when at least two wireless devices send data at the same time on overlapping radio resources. In this description, reference will be made to Narrow Band wireless devices, i.e. NB devices, which are capable of receiving and decoding signals on a first bandwidth channel, herein denoted B1. Reference will also be made to legacy wireless devices, i.e. legacy devices, which are capable of receiving and decoding signals on a second bandwidth channel herein denoted B2, which is broader than B1. Furthermore, the broad second bandwidth channel B2 covers the narrower first bandwidth channel B1 in the sense that the frequency band available for B1 is within the frequency band available for B2.

The term "legacy wireless device" may refer to a device of older date which is only capable of communicating over the broad channel B2 while the term "Narrow Band wireless device" may refer to a relatively "modern" device of more recent date which is designed to communicate over the narrow channel B1. In the field of WiFi networks, it is further desirable to provide MTC devices as NB devices thanks to their simpler construction and lower power consumption, as compared to other types of wireless devices such as legacy devices. MTC devices may typically be used for automatically reporting measurements and other observations to a central server or the like.

In this solution it has been recognized that when resources are allocated on B1 to an NB device and the NB device starts to transmit data on B1, a legacy device is not capable of detecting this allocation and transmission since it only operates on B2 and has no ability to receive and decode any signals on B1. The legacy device is therefore totally unaware that resources on B1 have been reserved for the NB device's transmission, and as a result the legacy device may unwittingly transmit on B2 at the same time as the NB device transmits on B1 so that a collision may occur. It should be noted that access points are typically capable of communicating over both a narrowband channel and a wideband channel, such as 2 MHz and 20 MHz, respectively, so both NB devices and legacy devices can be served by the same access point. A legacy device may be configured to operate according to the above-mentioned IEEE standard 802.11 and its variants, e.g. 802.11ax, 802.11n, etc. In this standard, a wireless device is referred to as STA.

There are some existing mechanisms that might be used by the legacy device to detect whether there is any ongoing transmission on a given "wireless medium" such as a bandwidth channel. For example, Clear Channel Assessment, CCA, is physical carrier sensing mechanism which samples the activity of the wireless medium via the radio interface and indicates whether the wireless medium is currently used by another transmitter (BUSY) or not used (IDLE), for a current time and frequency. CCA is composed of two related functions, Carrier Sense, CS, and Energy Detection, ED.

CS refers to the ability of a receiver to detect and decode an incoming 802.11 signal preamble. In addition, CCA must be indicated as BUSY when another 802.11 signal preamble is detected, and must be kept BUSY for the length of the received frame as indicated in the frame's Physical Layer Convergence Protocol, PLCP, length field. Typically, any incoming 802.11 frame whose PLCP header can be decoded will cause CCA to indicate the medium as BUSY for the time required for the frame transmission to be completed.

ED refers to the ability of the receiver to detect an energy level present within the sensed channel bandwidth based on interference sources which may include non-802.11 transmissions and 802.11 transmissions that cannot be decoded. Unlike CS which can determine the exact length of time the medium will be busy with the current frame, ED needs to sample the wireless medium every slot time to determine if the energy still exists on the medium. ED requires a predefined threshold which determines if the reported energy level is adequate to indicate the medium as BUSY or IDLE. The ED threshold is usually much lower for valid 802.11 signals that can be decoded using carrier sense than it is for non-802.11 signals.

It may however not be possible sometimes for a legacy device to detect whether a sensed bandwidth channel is occupied using the above methods, particularly when only a fraction of the broad channel bandwidth B2 is occupied by an NB device or STA transmitting on the narrow channel bandwidth B1. For example, during uplink NB transmissions on a 2 MHz channel bandwidth from an NB STA, a legacy 802.11 STA cannot decode the NB transmissions, and it performs ED over a 20 MHz channel bandwidth. Most likely, the legacy 802.11 STA will not be able to detect the uplink NB transmissions and will start transmitting its own signal, causing interference to the uplink NB transmission. This is sometimes referred to as the "hidden node problem".

The above situation of simultaneous and colliding transmissions by an NB device and a legacy device can be avoided by functionality in an access node as follows. When receiving a request or the like from the NB device for transmitting pending uplink data, the access node performs a downlink transmission that both NB devices and legacy devices can receive and decode so that the legacy device will know that it should not transmit anything when the NB device is allowed to transmit. Thereby, it is an advantage that the NB device's uplink transmission is protected from interference by transmission from the legacy device. In more detail, the downlink transmission indicates that the NB device is allowed to transmit its pending uplink data on allocated resources within the first bandwidth channel B1, in response to the received request. The downlink transmission also indicates that the second bandwidth channel B2 is occupied, e.g. for a certain duration indicated in the downlink transmission.

Figure 2:
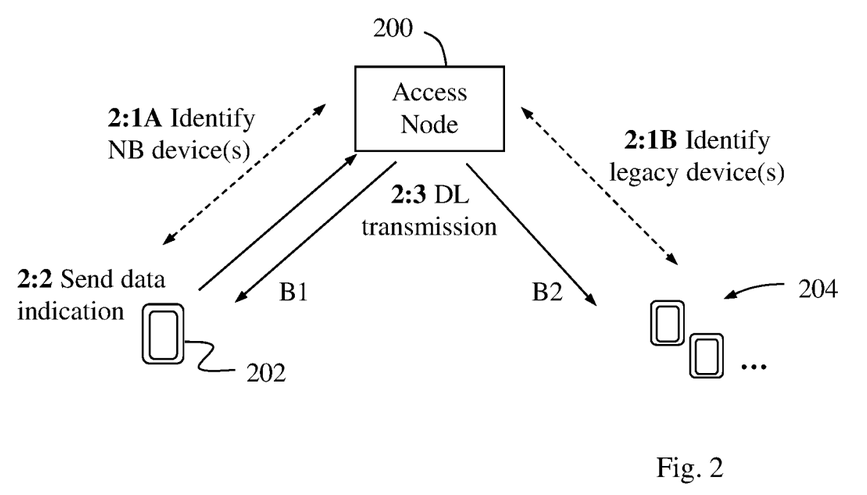
FIG. 2 is a communication scenario illustrating an example of how the solution may be employed, according to some possible embodiments.

An example of a communication scenario where the solution and its embodiments can be used, is illustrated in FIG. 2 involving an access node 200 of a wireless network, an NB device 202 and one or more legacy devices 204. The devices 202, 204 may be served by the access node 200, e.g. either in idle mode or in connected mode, or either in sleep mode or in active mode, depending on the terminology used, although the solution is not limited in this respect. The solution may also be used when one or more of the wireless devices 202, 204 are within reception range but not currently being served by the access node 200, e.g. when being served by a neighboring access node, not shown.

An action 2:1A illustrates that the access node 200 detects and identifies the wireless device 202 as being an NB device that is capable of receiving and decoding signals on the above-mentioned first bandwidth channel B1. Another action 2:1B illustrates that the access node 200 detects and identifies the one or more devices 204 as being one or more legacy devices that are capable of receiving and decoding signals on the above-mentioned second bandwidth channel B2. Actions 2:1A and 2:1B may be performed basically in any order or at the same time. Thereby, the access node 200 knows there both NB and legacy devices are present.

In a next action 2:2, the NB device 202 sends an indication of pending uplink data to the access node 200, which is effectively a request to perform an uplink transmission of data. Knowing that there is a mix of NB and legacy devices present, the access node 200 performs a downlink transmission that both NB devices and legacy devices can receive and decode, in another action 2:3. As mentioned above, the downlink transmission indicates that the NB device is allowed to transmit its pending uplink data on the first bandwidth channel B1, and that the second bandwidth channel B2 is occupied.

The solution and some possible embodiments will now be described in terms of functionality in an access node of a wireless network. Although the term "access node" is used throughout this description, other alternative terms that could also be used may include network node, base station, eNodeB, access point, radio node, radio network node, and so forth.

Figure 3:
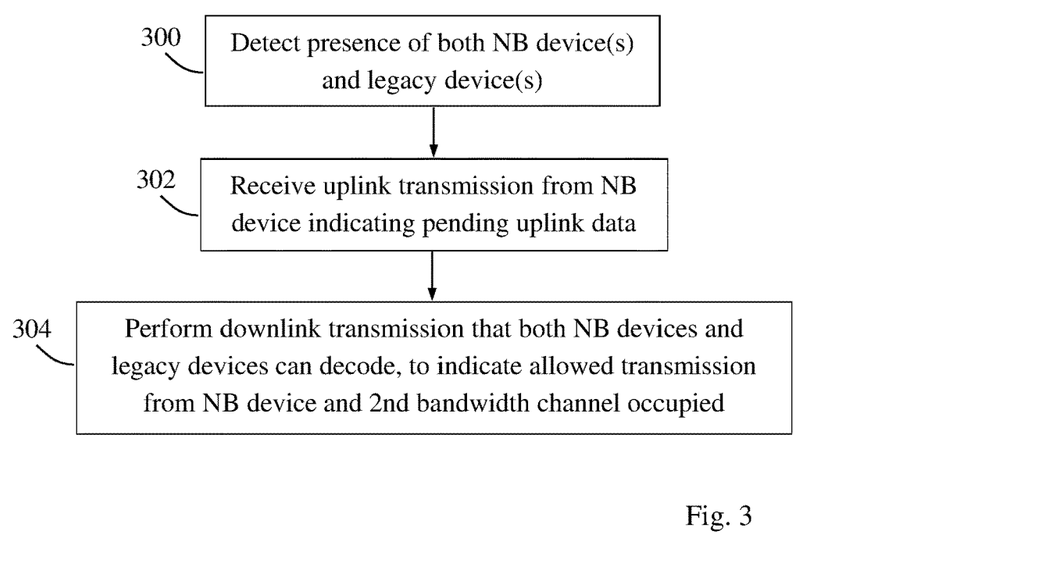
FIG. 3 is a flow chart illustrating a procedure in an access node, according to further possible embodiments.

An example will now be described, with reference to the flow chart in FIG. 3, of how the solution may be employed in terms of actions which may be performed in an access node of a wireless network, for controlling uplink transmissions from wireless devices. Without limiting the described features and embodiments, reference will also be made to the example scenario shown in FIG. 2. A first action 300 illustrates that the access node 200 detects presence of at least one Narrow Band wireless device 202 capable of receiving and decoding signals on a first bandwidth channel B1 and at least one legacy wireless device 204 capable of receiving and decoding signals on a second bandwidth channel B2 which is broader than and covers the first bandwidth channel B1.

In a next action 302, the access node 200 receives from a Narrow Band wireless device 202 an uplink transmission that indicates pending uplink data in the Narrow Band wireless device 202. In some non-limiting examples, the uplink transmission from NB device 202 may be a Request-To-Send, RTS, message or a Null Data Packet, NDP. In the IEEE standard 802.11, a STA may generally initiate an uplink data transmission by sending an RTS frame. The receiving access node responds with a Clear-To-Send, CTS, frame. Further, the STA must receive a CTS frame before sending any data frame. The RTS and CTS frames also contain a time value that alerts any other STAs to hold off from accessing the medium while the station initiating the RTS transmits its data, according to the time value, e.g. by setting the above-mentioned NAV timer in the STA.

In a next action 304, the access node 200 performs a downlink transmission that both Narrow Band wireless devices and legacy wireless devices can receive and decode. The downlink transmission indicates that the Narrow Band wireless device 202 is allowed to transmit its pending uplink data on allocated resources within the first bandwidth channel B1, in response to the received request, and that the second bandwidth channel B2 is occupied. Some examples of how the downlink transmission may be performed in more detail will be described below.

Some optional embodiments that may be employed in the above procedure of FIG. 3 will now be described. First, it should be mentioned that the current 802.11ax specification introduces a "Trigger Frame", TF, which is transmitted by the access node and is used to allocate resource for uplink multi-user transmission for a set of scheduled STAs. There also exists a "Trigger Frame-Random Access", TF-R, which indicates that one or more resource units are allocated for uplink random access. The Trigger Frame cannot be decoded by older legacy devices operating according to any of IEEE 802.11ac/n/a/b/g, etc. The Trigger Frame may be employed in two alternative embodiments as follows.

In one example embodiment, the detected at least one legacy wireless device 204 includes a wireless device that is incapable of using the IEEE standard 802.11ax, referred to as a "non-802.11ax legacy device". This legacy device consequently cannot "understand" a Trigger Frame. In this case, the downlink transmission of action 304 is comprised of a Clear-To-Send, CTS, message transmitted on the second bandwidth channel B2 which indicates that the second bandwidth channel B2 is occupied. Thereby, the non-802.11ax legacy device(s) are able to detect and decode the CTS message on B2 and refrain from transmitting accordingly on B2. The downlink transmission of action 304 is also comprised of a Trigger Frame transmitted on the first bandwidth channel B1 which indicates that the Narrow Band wireless device 202 is allowed to transmit uplink data on the allocated resources within the first bandwidth channel B1.

In some further example embodiments, the above Trigger Frame and CTS message may be transmitted separately in time or simultaneously as frequency multiplexed. In other words, the Trigger Frame may be transmitted first and the CTS message may be transmitted afterwards, or the CTS message may be transmitted first and the Trigger Frame may be transmitted afterwards, or the CTS message and the Trigger Frame may be transmitted at the same time as frequency multiplexed on B2 and B1, respectively.

In another example embodiment, the above transmitted CTS message may indicate the time the second bandwidth channel B2 is occupied, which may be indicated in the above-described duration field when included in the CTS message.

In another example embodiment, which is an alternative to the first mentioned embodiment above, it is assumed that all of the detected at least one legacy wireless device 204 is/are capable of using the IEEE standard 802.11ax, and thereby also to "understand" a Trigger Frame. In this case, the downlink transmission of action 304 is comprised of a first Trigger Frame transmitted on the first bandwidth channel B1 which indicates that the Narrow Band wireless device 202 is allowed to transmit uplink data on the allocated resources within the first bandwidth channel B1. The downlink transmission is further comprised of a second Trigger Frame transmitted on the second bandwidth channel B2 which indicates that the legacy wireless device(s) 204 is/are allowed to transmit uplink data on resources within the second bandwidth channel B2 but outside the allocated resources within the first bandwidth channel B1. Thereby, the 802.11ax device(s) are able to detect and decode the second Trigger Frame on B2 and refrain from transmitting accordingly on B2.

In some further example embodiments, the above first and second Trigger Frames may be transmitted separately in time or simultaneously as frequency multiplexed. In other words, the first Trigger Frame may be transmitted first and the second Trigger Frame may be transmitted afterwards, or the second Trigger Frame may be transmitted first and the first Trigger Frame may be transmitted afterwards, or the first and second Trigger Frames may be transmitted at the same time as frequency multiplexed on B2 and B1, respectively.

In further example embodiments, the uplink transmission may be received from the NB device 202 as a request for channel access such as a Request-To-Send, RTS, message or a Null Data Packet, NDP. NDP is a physical layer protocol data unit, PPDU, that carries no physical layer payload, thus it is short and transmitted with the most robust Modulation and Coding Scheme, MCS. As a non-limiting example, the first bandwidth channel B1 may be a 2 MHz channel and the second bandwidth channel B2 may be a 20 MHz channel, although any other bandwidth channels may be used in the procedures and embodiments described herein.

By employing the above-described procedure, it is an advantage that an NB device's uplink transmission can be protected from interference by informing any legacy device(s) that their bandwidth channel B2 is occupied. It is also an advantage that the access node can allocate resources in a spectrally efficient manner for the NB device and any legacy device(s) 204 capable of using the IEEE standard 802.11ax, and inform other legacy device(s) to avoid transmission in the allocated resources, depending on the present mix of devices.

Another example will now be described, with reference to the flow chart in FIG. 4, of how the above-described access node may operate in practice according to further embodiments. A first action 400 illustrates that the access node identifies which types of wireless devices are present, i.e. by being within reception distance from the access node so that they are able to receive downlink transmissions from the access node. In this action, the access node detects presence of both an NB device capable of using a "narrow channel" B1, e.g. 2 MHz, and one or more legacy devices capable of using a "broad channel" B2, e.g. 20 MHz, in the manner described above.

In a next action 402, the access node receives from the NB device an uplink transmission that indicates pending uplink data in the NB device, which corresponds to action 302 above. The access node then determines in an action 404, whether the one or more identified legacy devices includes any legacy device that is incapable of using the IEEE standard 802.11ax, herein denoted a non-802.11ax legacy device. If not, the access node transmits a Trigger Frame on both the broad channel B2 and the narrow channel B1, in an action 406, corresponding to the above-described embodiment where first and second Trigger Frames were comprised in the downlink transmission of action 304.

On the other hand, If it is determined in action 404 that the one or more identified legacy devices includes a non-802.11ax legacy device, the access node transmits a CTS message on the broad channel B2 and a Trigger Frame on the narrow channel B1, in an alternative action 408. This action 408 corresponds to the above-described embodiment where a CTS message and a Trigger Frame were comprised in the downlink transmission of action 304.

Figure 4:
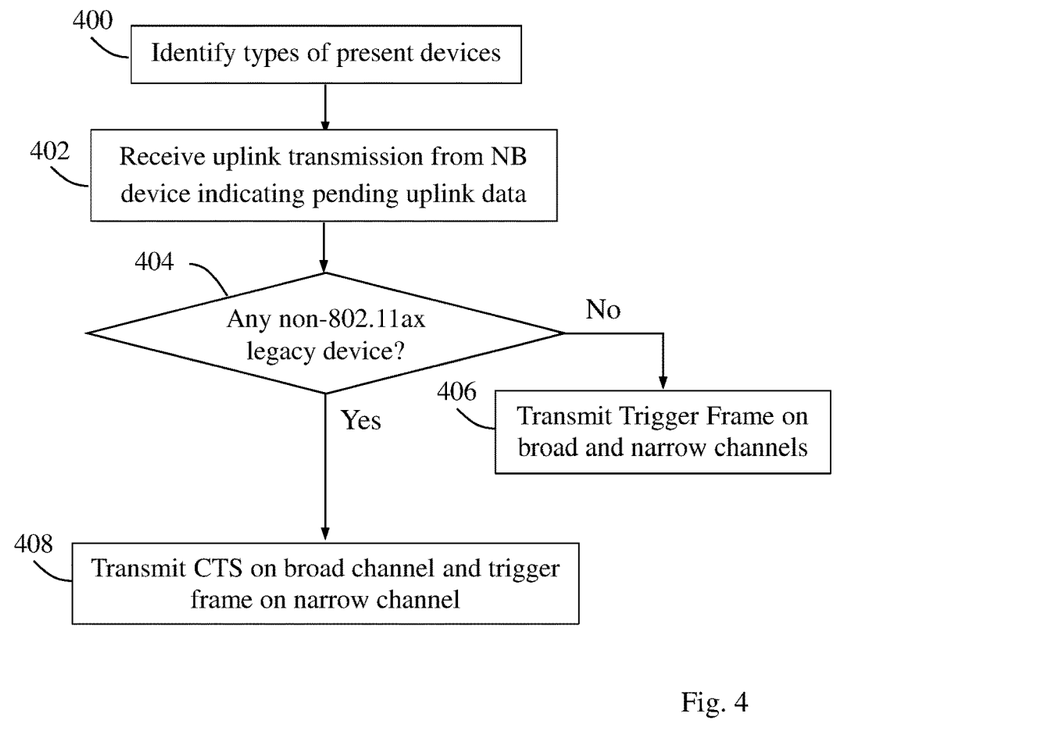
FIG. 4 is a flow chart illustrating an example of how the procedure of FIG. 3 may be performed, according to further possible embodiments.
Figure 5:
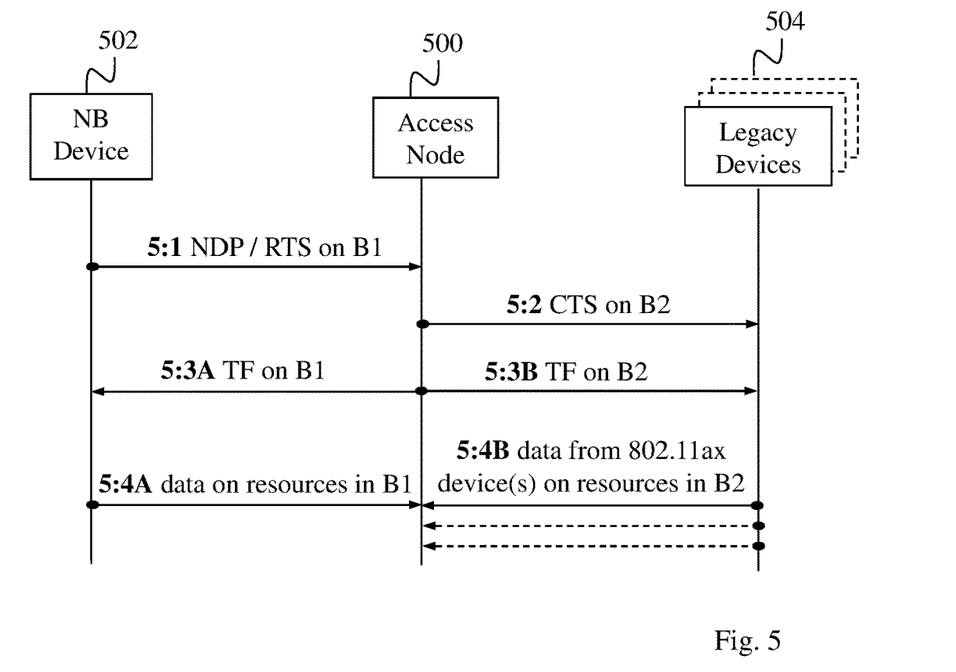
FIG. 5 is a signaling diagram illustrating an example of a procedure when the solution is used, according to further possible embodiments.

FIG. 5 illustrates an example of a communication where some of the above-described embodiments can be used involving an access node 500 of a wireless network, which node operates to perform the actions 400-408 but not action 406 in FIG. 4. It is assumed that the access node 500 has detected presence of both an NB device 502 capable of using a "narrow channel" B1, and two or more legacy devices 504 capable of using a "broad channel" B2. The access node 500 has also identified at least one legacy device that is incapable of using the IEEE standard 802.11ax and also at least one legacy device that is capable of using the IEEE standard 802.11ax. In this example there is thus a mix of NB, 802.11ax and non-802.11ax legacy devices.

A first action 5:1 illustrates that the NB device 502 sends a request for channel access, such as an RTS message or an NDP, which is received by the access node 500. In a next action 5:2, the access node 500 transmits a CTS message on B2 which can be received and decoded by the legacy devices 504. As in the above-described embodiment, the CTS message indicates that B2 is occupied so that the non-802.11ax legacy device(s) will be alerted not to transmit anything on B2.

In a next action 5:3A, the access node 500 further transmits a Trigger Frame on B1 which can be received and decoded only by the NB device 502. As in one of the above-described embodiments, the Trigger Frame indicates that the NB device 502 is allowed to transmit uplink data on allocated resources within B1. In a further action 5:3B, the access node 500 transmits another Trigger Frame on B2 which can be received and decoded by the legacy device that is capable of using the IEEE standard 802.11ax. Here, the latter Trigger Frame indicates that the 802.11ax legacy device(s) is/are allowed to transmit uplink data on allocated resources within B2 but outside the resources allocated to the NB device 502 within B1.

In a following action 5:4A, the NB device 502 transmits its uplink data on the allocated resources in B1. A further action 5:4B illustrates that the 802.11ax device(s) transmit uplink data on the allocated resources in B2. In conclusion, the NB device 502 communicates with the access node 500 on B1 in actions 5:1, 5:3A and 5:4A, while the legacy devices 504 communicate with the access node 500 on B2 in actions 5:2, 5:3B and 5:4B. It should also be noted that the 802.11ax legacy device(s) transmit uplink data in accordance with the Trigger Frame of action 5:3B, while the non-802.11ax legacy device(s) do not transmit anything on B2 in accordance with the CTS message of action 5:2.

Figure 6:
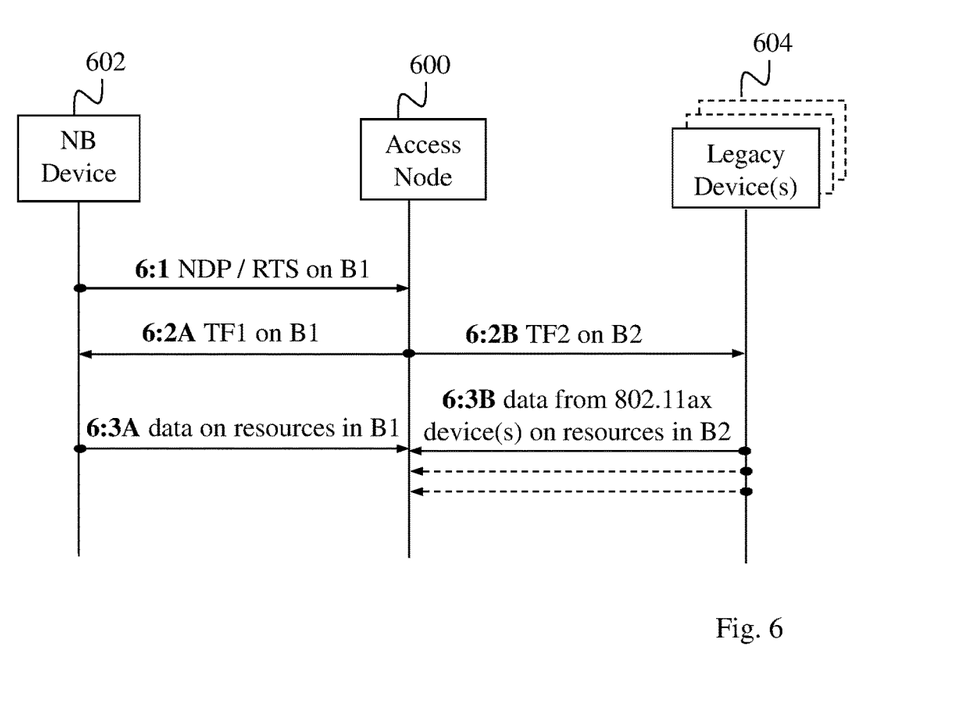
FIG. 6 is a signaling diagram illustrating another example of a procedure when the solution is used, according to further possible embodiments.

FIG. 6 illustrates another example of a communication where some of the above-described embodiments can be used involving an access node 600 of a wireless network, which node operates to perform the actions 400-406 but not action 408 in FIG. 4. Here, it is assumed that the access node 600 has detected presence of both an NB device 602 capable of using a "narrow channel" B1 and one or more legacy devices 604 capable of using a "broad channel" B2. In this case the access node 500 has also identified that the legacy device(s) 604 is/are capable of using the IEEE standard 802.11ax. In this example there is thus a mix of NB and 802.11ax legacy devices, while no non-802.11ax legacy device is present.

As in the previous example, a first action 6:1 illustrates that the NB device 602 sends a request for channel access, such as an RTS message or an NDP, which is received by the access node 600. In response thereto, the access node 600 transmits a first Trigger Frame on B1 in an action 6:2A, which can be received and decoded only by the NB device 602. The Trigger Frame indicates that the NB device 602 is allowed to transmit uplink data on allocated resources within B1. In a further action 6:2B, the access node 600 transmits a second Trigger Frame on B2 which can be received and decoded by the detected and identified 802.11ax legacy device(s) 604. The second Trigger Frame indicates that the 802.11ax legacy device(s) 604 is/are allowed to transmit uplink data on allocated resources within B2 but outside the resources allocated to the NB device 602 within B1.

In a following action 6:3A, the NB device 602 transmits its uplink data on the allocated resources in B1. A further action 6:3B illustrates that the 802.11ax device(s) 604 transmit uplink data on the allocated resources in B2. This way, the access node 600 is able to multiplex resources on B1 and B2 for the data transmissions from the NB device 602 and the 802.11ax device(s) 604, respectively.

Figure 7:
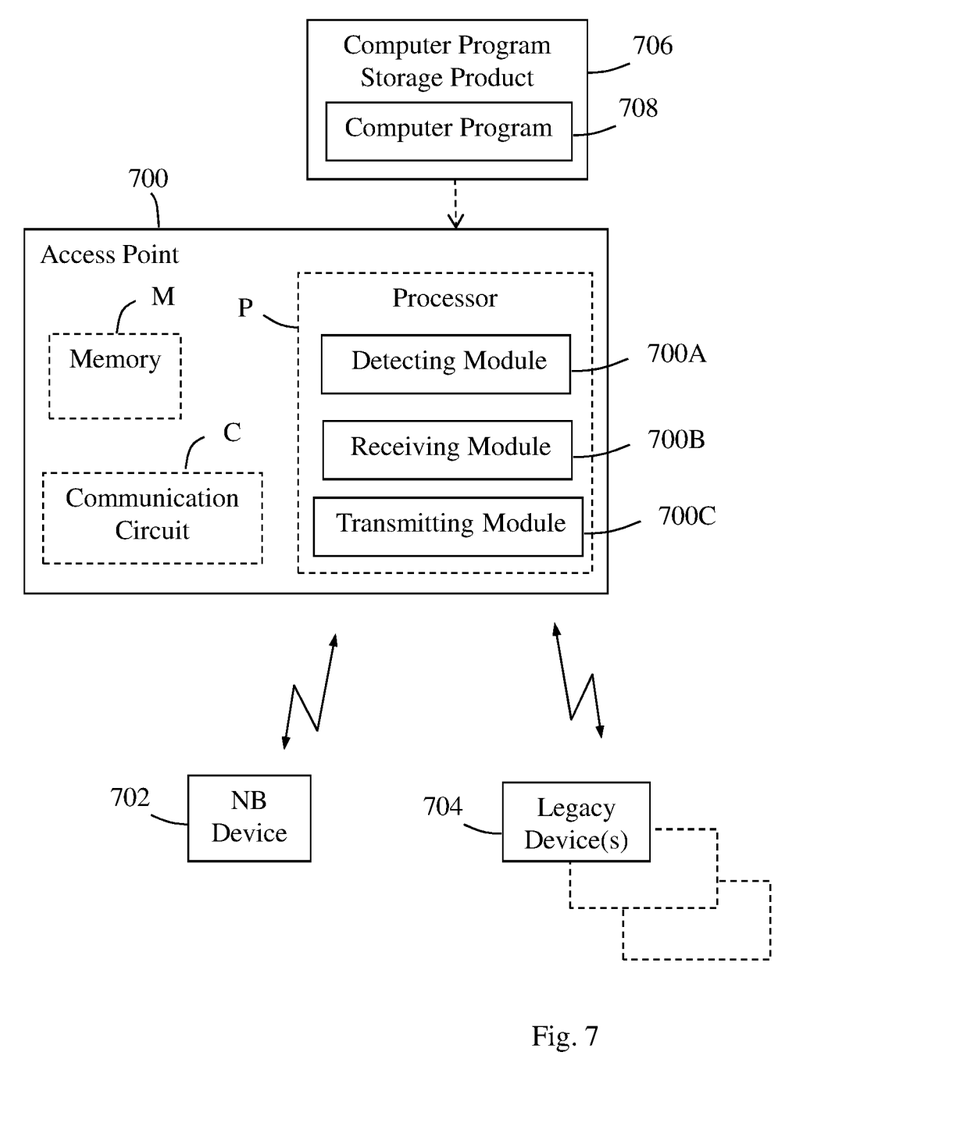
FIG. 7 is a block diagram illustrating an access node in more detail, according to further possible embodiments.

The block diagram in FIG. 7 illustrates a detailed but non-limiting example of how an access node 700 may be structured to bring about the above-described solution and embodiments thereof. The access node 700 may be configured to operate according to any of the examples and embodiments of employing the solution as described above, where appropriate, and as follows. The access node 700 is shown to comprise a processor P and a memory M, said memory comprising instructions executable by said processor P whereby the access node 700 is operable as described herein. The access node 700 also comprises a communication circuit C with suitable equipment for receiving and transmitting signals in the manner described herein.

The communication circuit C is configured for communication with wireless devices over a radio interface using suitable protocols depending on the implementation, which is not necessary to describe here as such in any detail. The solution and embodiments herein are thus not limited to using any specific types of networks, technology or protocols for radio communication.

The access node 700 is operable in a wireless network and comprises means configured or arranged to perform at least some of the actions 300-304, 400-408, 5:1-5:4A,B and 6:1-6:3A,B in FIGS. 3-6, respectively. The access node 700 is arranged to control uplink transmissions from wireless devices in a wireless network.

The access node 700 is configured to detect presence of at least one Narrow Band wireless device 702 capable of receiving and decoding signals on a first bandwidth channel B1 and at least one legacy wireless device 704 capable of receiving and decoding signals on a second bandwidth channel B2 which is broader than and covers the first bandwidth channel B1. This operation may be performed by a detecting module 700A in the access node 700, e.g. in the manner described above for action 300.

The access node 700 is further configured to receive from a Narrow Band wireless device 702 an uplink transmission that indicates pending uplink data in the Narrow Band wireless device 702. This operation may be performed by a receiving module 700B in the access node 700, e.g. as described above for action 302.

The access node 700 is also configured to perform a downlink transmission that both Narrow Band wireless devices and legacy wireless devices can receive and decode, wherein the downlink transmission indicates that the Narrow Band wireless device 702 is allowed to transmit its pending uplink data on allocated resources within the first bandwidth channel B1, in response to the received request, and that the second bandwidth channel B2 is occupied. This operation may be performed by a transmitting module 700C in the access node 700, e.g. as described above for action 304.

It should be noted that FIG. 7 illustrates various functional units in the access node 700, and the skilled person is able to implement these functional units in practice using suitable software and hardware. Thus, the solution is generally not limited to the shown structures of the access node 700, and the functional modules or units 700A-C therein may be configured to operate according to any of the features and embodiments described in this disclosure, where appropriate.

The functional modules 700A-C described above can be implemented in the access node 700 by means of suitable hardware and program modules of a computer program comprising code means which, when run by the processor P causes the access node 700 to perform at least some of the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the access node 700 in the form of a memory having a computer readable medium and being connected to the processor P. The computer program product or memory in the access node 700 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the access node 700.

The solution described herein may be implemented in the access node 700 by means of a computer program storage product 706 comprising a computer program 708 with computer readable instructions which, when executed on the access node 700, cause the access node 700 to carry out the actions according to any of the above embodiments, where appropriate.

While the solution has been described with reference to specific exemplifying embodiments, the description is generally only intended to illustrate the inventive concept and should not be taken as limiting the scope of the solution. For example, the terms "access node", "wireless device", "NB device", "legacy device", "uplink data", and "downlink transmission" have been used throughout this disclosure, although any other corresponding entities, functions, and/or parameters could also be used having the features and characteristics described here. The solution is defined by the appended claims.

The invention claimed is:

1. A method performed by an access node of a wireless network, for controlling uplink transmissions from wireless devices, the method comprising:
   detecting presence of at least one Narrow Band wireless device capable of receiving and decoding signals on a first bandwidth channel and at least one legacy wireless device capable of receiving and decoding signals on a second bandwidth channel which is broader than and covers the first bandwidth channel, wherein when the detected at least one legacy wireless device includes a wireless device that is incapable of using the IEEE standard 802.11ax,
   receiving from a Narrow Band wireless device an uplink transmission that indicates pending uplink data in the Narrow Band wireless device, and
   performing a downlink transmission comprising a Trigger Frame transmitted on the first bandwidth channel which indicates that the Narrow Band wireless device is allowed to transmit its pending uplink data on allocated resources within the first bandwidth channel, in response to the received request, and a Clear-To-Send, CTS, message transmitted on the second bandwidth channel which indicates that the second bandwidth channel is occupied.

2. A method according to claim 1, wherein the Trigger Frame and the CTS message are transmitted separately in time or simultaneously as frequency multiplexed.

3. A method according to claim 1, wherein the transmitted CTS message indicates the time the second bandwidth channel is occupied.

4. A method according to claim 1, wherein when all of the detected at least one legacy wireless device is/are capable of using the IEEE standard 802.11ax, the downlink transmission is comprised of a first Trigger Frame transmitted on the first bandwidth channel which indicates that the Narrow Band wireless device is allowed to transmit uplink data on the allocated resources within the first bandwidth channel, and a second Trigger Frame transmitted on the second bandwidth channel which indicates that the legacy wireless device(s) is/are allowed to transmit uplink data on resources within the second bandwidth channel but outside the allocated resources within the first bandwidth channel.

5. A method according to claim 4, wherein the first and second Trigger Frames are transmitted separately in time or simultaneously as frequency multiplexed.

6. A method according to claim 1, wherein the uplink transmission is received as a request for channel access such as a Request-To-Send, RTS, message or a Null Data Packet, NDP.

7. A method according to claim 1, wherein the first bandwidth channel is a 2 MHz channel and the second bandwidth channel is a 20 MHz channel.

8. An access node arranged to control uplink transmissions from wireless devices in a wireless network, comprising:
   one or more processors; and
   a memory, wherein said memory comprising instructions, which when executed by the one or more processors, cause the one or more processors to perform operations to the access node to:
   detect presence of at least one Narrow Band wireless device capable of receiving and decoding signals on a first bandwidth channel and at least one legacy wireless device capable of receiving and decoding signals on a second bandwidth channel which is broader than and covers the first bandwidth channel, wherein when the detected at least one legacy wireless device includes a wireless device that is incapable of using the IEEE standard 802.11ax,
   receive from a Narrow Band wireless device an uplink transmission that indicates pending uplink data in the Narrow Band wireless device, and
   perform a downlink transmission comprising a Trigger Frame transmitted on the first bandwidth channel which indicates that the Narrow Band wireless device is allowed to transmit its pending uplink data on allocated resources within the first bandwidth channel, in response to the received request, and a Clear-To-Send, CTS, message transmitted on the second bandwidth channel which indicates that the second bandwidth channel is occupied.

9. An access node according to claim 8, wherein the access node is configured to transmit the Trigger Frame and the CTS message separately in time or simultaneously as frequency multiplexed.

10. An access node according to claim 8, wherein the transmitted CTS message indicates the time the second bandwidth channel is occupied.

11. An access node according to claim 8, wherein when all of the detected at least one legacy wireless device is/are capable of using the IEEE standard 802.11ax, the downlink transmission is comprised of a first Trigger Frame transmitted on the first bandwidth channel which indicates that the Narrow Band wireless device is allowed to transmit uplink data on the allocated resources within the first bandwidth channel, and a second Trigger Frame transmitted on the second bandwidth channel which indicates that the legacy wireless device(s) is/are allowed to transmit uplink data on resources within the second bandwidth channel but outside the allocated resources within the first bandwidth channel.

12. An access node according to claim 11, wherein the access node is configured to transmit the first and second Trigger Frames separately in time or simultaneously as frequency multiplexed.

13. An access node according to claim 8, wherein the access node is configured to receive the uplink transmission as a request for channel access such as a Request-To-Send, RTS, message or a Null Data Packet, NDP.

14. An access node according to claim 8, wherein the first bandwidth channel is a 2 MHz channel and the second bandwidth channel is a 20 MHz channel.

15. A computer program comprising instructions which, when executed on at least one processor, cause the at least one processor to carry out the method according to claim 1.

* * * * *